United States Patent [19]
Deininger et al.

[11] Patent Number: 5,154,319
[45] Date of Patent: Oct. 13, 1992

[54] APPARATUS FOR THE DISPENSING OF LIQUIDS IN MEASURED AMOUNTS

[75] Inventors: Anton Deininger, Bachhagel; Karlheinz Färber, Giengen/Brenz; Heinz-Werner Giefer, Bergenweiler/Brenz; George Plester, Essen, all of Fed. Rep. of Germany; Frederick D. Schorr, Decatur, Ga.; Georg Troska, Herten, Fed. Rep. of Germany

[73] Assignees: The Coca-Cola Company, Atlanta, Ga.; Bosch-Siemens Hausgerate GmbH, Munich, Fed. Rep. of Germany

[21] Appl. No.: 616,918

[22] Filed: Nov. 21, 1990

Related U.S. Application Data

[63] Continuation-in-part of Ser. No. 410,882, Sep. 22, 1989, Pat. No. 5,058,780.

[30] Foreign Application Priority Data

Dec. 11, 1989 [DE] Fed. Rep. of Germany ....... 3940877

[51] Int. Cl.⁵ .............................................. B67D 5/00
[52] U.S. Cl. ................................ 222/105; 222/129.1; 222/321; 222/379; 222/538; 74/53
[58] Field of Search ................ 222/96, 105, 185, 321, 222/333, 504, 538, 540, 383, 129.1, 129.4, 509, 530, 379; 417/415; 74/53

[56] References Cited

U.S. PATENT DOCUMENTS

| 999,602 | 8/1911 | Slee | 222/185 |
|---|---|---|---|
| 2,858,052 | 10/1958 | Costakos | 222/185 |
| 4,015,755 | 4/1977 | Lerner et al. | 222/504 X |
| 4,162,028 | 7/1979 | Reichenberger | 222/129.4 |
| 4,444,336 | 4/1984 | Nielsen | 222/129.4 |
| 4,693,400 | 9/1987 | Frahm et al. | 222/538 X |
| 4,722,458 | 2/1988 | Van Pal | 222/105 |
| 4,753,370 | 6/1988 | Rudick | 222/129.1 X |

FOREIGN PATENT DOCUMENTS

| 0010963 | 5/1980 | European Pat. Off. | 222/321 |
|---|---|---|---|
| 0011487 | 5/1980 | European Pat. Off. | 222/383 |
| 0246052 | 11/1987 | European Pat. Off. | 222/105 |
| 0254650 | 1/1988 | European Pat. Off. | 222/321 |

Primary Examiner—Michael S. Huppert
Assistant Examiner—Anthoula Pomrening
Attorney, Agent, or Firm—Birch, Stewart, Kolasch and Birch

[57] ABSTRACT

A beverage concentrate container includes an integrally connected piston pump as a concentrate dosing unit. The container and piston pump are insertable into rigid support within a beverage dispenser cabinet for mechanical interconnection with a drive mechanism for the pump. The container and pump combination (syrup package) are fabricated from materials which are disposable.

8 Claims, 1 Drawing Sheet

APPARATUS FOR THE DISPENSING OF LIQUIDS IN MEASURED AMOUNTS

This application is a continuation-in-part of prior (U.S. application Ser. No. 07/410,882 filed Sep. 22 1989, which is now U.S. Pat. No. 5,058,780.

BACKGROUND OF THE INVENTION

The present invention relates to a dosing device for the measured dispensing of liquids from a storage container, particularly for the measured dispensing of beverage concentrates in an automatic beverage dispenser, where drinks can be prepared by mixing a base liquid, e.g. carbonated water, and at least one beverage concentrate stored in a storage tank. The dosing device is integrally connected with the storage container and the container/doser combination is disposable.

Such a device will preferably be able to provide, in automatic beverage dispensers where carbonated water is mixed with beverage concentrates to make a soft drink, the beverage concentrates in controlled amounts from a storage tank for the mixing process involved in the making of a post-mix beverage. In this connection it is particularly important, while utilizing the simplest possible means when measuring out the carbonated water, to also precisely measure out the dispensed beverage concentrates in order to achieve with necessary precision the desired mix proportions for the post-mix drink being prepared. These mix proportions shall achieve the same standard as the comparable ready-made (pre-mix) drinks on the market in bottles or cans.

For placement into automatic beverage dispensers to dispense beverage concentrates, dosage chamber devices have been developed. These dosage chamber devices are attached to a storage tank with the dispensing mouth at the bottom. By means of a magnet system a control valve inside this dosage chamber device is raised from a lower position, where the outlet port of the chamber is closed, to a higher position, where the inlet port of the chamber is closed, so that the contents of the dosage chamber can flow out by force of of gravity. However, the dosage chamber space can become filled with air. When the control valve resumes its lower position, the beverage concentrate stored in the storage tank ends up in the dosage chamber by force of gravity, and any air in the dosage chamber will flow into the storage tank. The control force needed to activate the control valve is correspondingly slight, since no actual propulsion force need be produced. There are storage tanks with either rigid or flexible walls. In both cases there is an exchange of volume through extracting beverage concentrates by the use of air.

The above-described dosage chamber devices are very difficult to reduce in size due to technical realities relating to size and the volume they dispense. They are above all suited for dispensing concentrates for 1/10 drink portion units. For smaller amounts greater problems with functioning and dosage precision are presented. So these known dosage chamber dispensers make it difficult to dispense individual drinks on demand.

It is also generally known how to extract and dispense liquid out of a flexible storage tank with the aid of a pump system. In such a system, a storage tank with flexible walls (bag-in-box containers) can be emptied without air having to flow into the storage tank for volume exchange. However, for beverage concentrates to achieve very precise dispensed amounts, these bag-in-box/pump systems have functional limitations.

SUMMARY OF THE INVENTION

The object of this invention pertains to an apparatus for dispensing of liquids in measured amounts which assures that the liquid stored in the liquid reservoir is dispensed by a standardized controlled delivery system taking into consideration the physical and chemical properties of the liquids to be mixed (volume specific), and taking into account the specific dispensing volume. Besides that, the device should meet all the requirements for simple and functional handling.

An apparatus which meets these requirements is characterized by the fact that a piston pump system is mounted onto the liquid container as a permanent fixture, and that the piston pump system is equipped with mechanical connections for a permanent installation of the piston pump housing on the container and for coupling to an operational drive lever of a mechanical drive installation which is permanently installed as part of the entire beverage dispenser unit.

The feature whereby the piston pump is integrally mounted onto the liquid storage container, and is designed to handle different types of liquids depending on their physical and chemical properties as related to a certain delivery volume per work stroke, is achieved so that the stored storage container with its piston pump system containing the liquid that is to be delivered can be connected to a mechanical drive installation. This standardized mechanical drive device assures that the correct volume of a particular liquid is delivered per work stroke (pump cycle), again taking into account the physical-chemical properties (liquid-specific, density) of the liquid.

This is particularly important when used in beverage dispensers in which these beverage concentrates are mixed with a diluent such as carbonated water for preparation of a post-mix beverage in which the concentration of the beverage concentrate is in the proper proportion with the added amount of carbonated water. In this case, it is desirable that empty storage tanks are to be replaced with new tanks of the same type of beverage concentrate and to install storage tanks with different types of beverage concentrates according to the requests of the user. Errors related to service which may result in false mixing ratios are not possible with this newly invented device. The fact that the piston pump system has mechanical connections to accommodate a permanent installation of the piston pump housing on the container and is designed to couple with operational elements of a permanently fixed drive installation guarantees a reliable and proper operation, and simple handling by service personnel. Inside the housing (dispenser cabinet) of the apparatus the corresponding mounted and coupling counterparts are arranged in a way that the piston pump system with its storage tank rests on top of it can be inserted at the front side.

According to a preferred design, the invented device is characterized by the fact that the storage tank contains a laminated, flexible bag which contains the stored liquid in the correct specified volume. Particularly, with respect to the transportation, stacking and handling the laminated bag of the storage tank is enclosed by a square-shaped cardboard container with rigid container walls to the outside, so that the atmospheric balance to the inside is accounted for. With respect to a piston pump system, it is possible to use a laminated bag without air circulation in the inside as the suction power transferred onto the liquid of the storage tank by way of the piston pump system assures a reliable dispensing volume, even if different counterforces permeating the walls of the laminated sack would cause a temporary collapse of the laminated sack.

When designed in another preferable way, the invented device is characterized by a feature in which the piston pump system is connected to the storage tank by way of a cone-shaped elastic intermediate piece which holds the piston pump system in its working operation and located to the outside of the rigid edges of the storage tank, and when set up for transport and storage, the middle piece holds the piston pump system within its rigid borders of the liquid storage tank.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
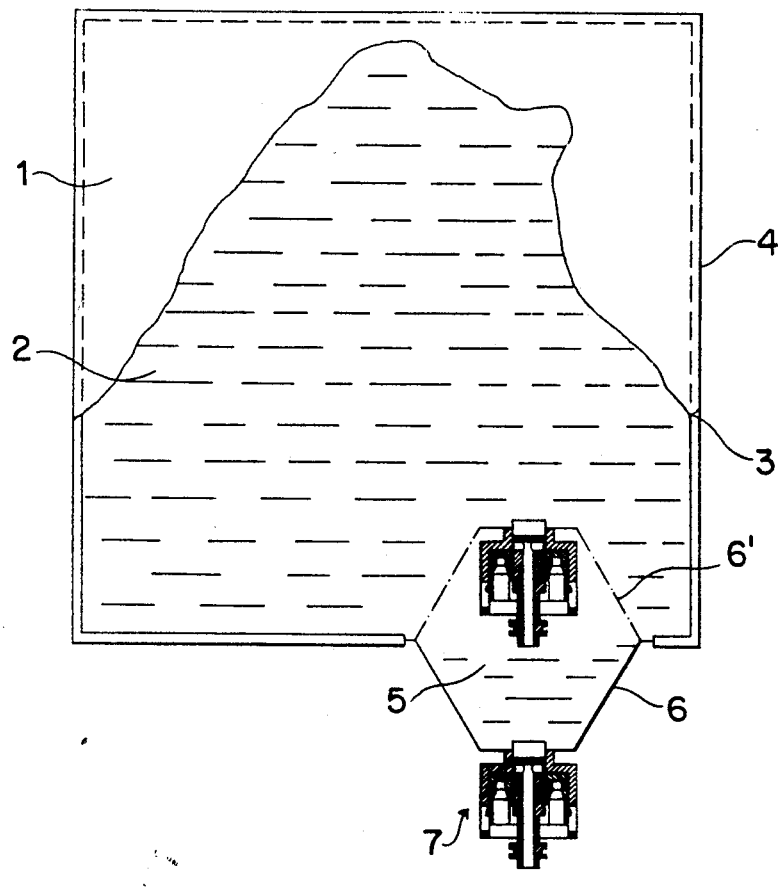
FIG. 1 illustrates a storage tank for a beverage concentrate with an integral device in accordance with the present invention.

According to FIG. 1, a storage tank 1 is provided to contain beverage concentrate 2, consisting of an inside-container (a bag) with flexible walls 3 and a box-shaped container 4 with rigid outside walls, such as cardboard, which encloses the inside container 3. The flexible walls 3 of the inside container adapt to the stored inlet volume of beverage concentrate 2 — illustrated by the broken lines— and to the stored remaining volume of concentrate 2 illustrated by the solid lines of the sketch. Thereby, it is important that air can get through cracks, openings or through porous material of wall 4 and can enter between wall 4 and wall 3 so that wall 3 can adapt to the decreasing volume of beverage concentrate 2. In the area of delivery location 5, the dispensing device is tightly connected with the wall 3 and wall 4 of the storage tank 1 by a cone 6 made of elastic material. The connections of cone 6 to the wall 4 results in a useful and desirable handling stability.

When getting ready to be transported or in storage position, the cone 6' with the dispensing device 7 is retracted into the inner part of the storage container 1 as shown by the figure of cone 6' indicated by interrupted lines. In operation in which the storage tank 1 is put into a beverage dispenser into which beverage concentrate is added by dispensing device 7 and to be mixed with carbonated water to make a complete refreshment beverage, cone 6 with the dispensing device 7 is pulled to the outside as shown by the illustration of a solid line.

Figure 2:
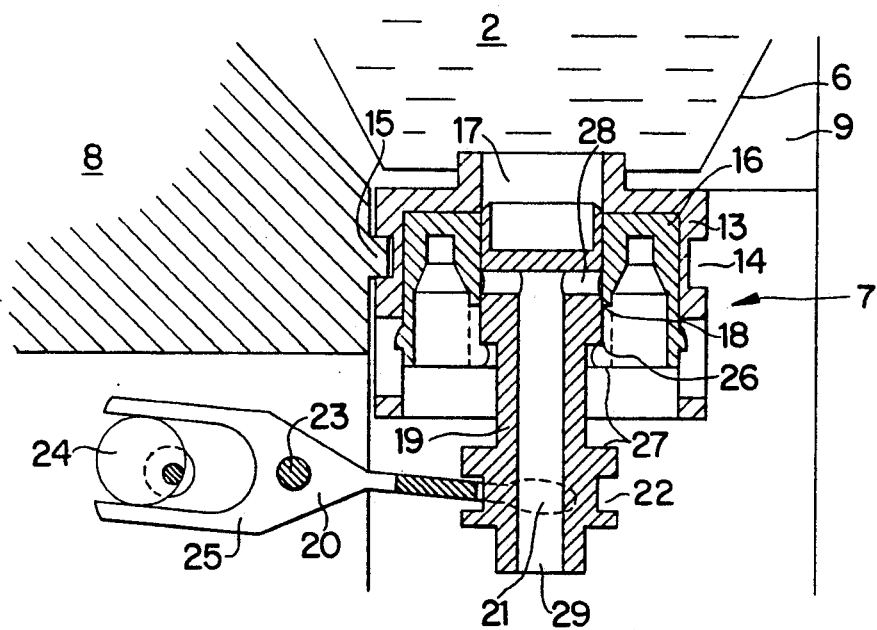
FIG. 2 illustrates the combined storage tank and doser of FIG. 1 and connected with a mechanical drive system in a beverage dispenser cabinet.

The arrangement illustrated in FIG. 2 is a portion of a beverage dispenser for dispensing of beverage concentrate 2 from a storage tank 1, whereby this beverage concentrate is to be mixed with carbonated water to make a post-mix beverage. Furthermore, in a cabinet 9 of the beverage dispenser/device housing 8 one or more storage tanks 1 are arranged side-by-side for beverage concentrates 2. In order to assure the desired mixing ratio with the second component, that is carbonated water, a piston pump system is installed serving as a dosing device 7 by which the beverage concentrate 2 is dispensed in measured amounts, stored and delivered in the proper way.

The piston pump system consists of a housing 13 which is insertable into the cabinet 8 of the beverage dispenser and rests inside this housing facing the front. Housing 13 of the piston pump system 7 includes a groove 14 into which a horse-shoe shaped protrusion of support 8 engages. Within this housing 13 of the piston pump system 7 there is a sliding accelerator piston 16 which is axially mounted between impact points. The lifting speed is based on these impact points which determines the delivery volume for the beverage concentrate 2 to be dispensed based on a typical work cycle. A conduit opening 17 inside the housing 13 of the piston pump system 7 extends to a storage tank 1 and concentrically meets with a central conduit 18 in the accelerator piston 16 so that a shaft of control piston 19 can be run inside it which can be axially shifted. The axial movement between control piston 19 and accelerator piston 16 is limited by the contact surfaces 27. The control piston 19 is driven by a lever 20 with a forked end which locks into a slot 22 of the control piston 19. The lever 20 is pivotally mounted around an axis 23 located in the rigid cabinet 9 and is driven by an eccentric 24 which is enclosed in a forked end by a second lever arm 25 of the lever 20. Eccentric 24 is driven by a motor (not shown) which rotates it in the direction of the arrow.

If the eccentric 24 illustrated in FIG. 1 keeps turning in a partial direction, the control piston 19 also will be moved downward over the contact points 26 of accelerator piston 16 so that the beverage concentrate 2 from the storage tank 1 will be drawn into the piston pump system through the inlet opening 17. Further turning of the eccentric 24 results in movement of the upper shaft of the control piston 19 into the region of the inlet opening 17 which is closed off thereafter. When the control piston 19 moves further upward, the contact points 27 between control piston 19 and accelerator piston 16 come together so that the accelerator piston 16 is moved upward along with the control piston 19.

The beverage concentrate volume which was originally drawn into the piston pump system 7 by suction and also into the control piston 19 thereafter is transported to a central delivery channel 29 by way of side channels 28. From this central delivery channel 29 the beverage concentrate arrives at a location where it is mixed with carbonated water. Various different work cycles can accumulate and can be accounted for in numbers which enables an exact dosage determination and set up of delivery amounts of the individual work cycles as well as the amount of total work cycles at a given time.

The fixed connection of the dispensing device 7 to a particular storage tank 1 and thus to the stored beverage concentrate contained therein serves the purpose that the beverage concentrate volume dispensed for each work cycle or work cycles by the dispensing device can immediately be determined based on a particular type of beverage concentrate and thus the required mixing ratio for the makeup of a refreshment beverage. The parts of the dispensing device 1 are preferably made of plastic.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for dispensing metered quantities of beverage concentrate for mixing with a diluent to produce a post-mix beverage comprising:
   a storage tank for containing the beverage concentrate, said storage tank having a discharge opening through which the concentrate may flow by gravity;
   positive displacement pump means integrally connected with the storage tank at the discharge opening thereof for withdrawing concentrate through the discharge opening from the storage tank by suction into a housing of the pump means, and discharging metered quantities of concentrate from said pump housing through an outlet thereof for mixing with the diluent in response to reciprocating movement of an actuator of said pump means;
   a cabinet for housing said storage tank for operative association with a supply of diluent, said cabinet including a coupling member therein for engaging the pump housing and rigidly supporting the storage tank; and
   drive means in said cabinet for engaging the actuator of the pump means while the storage tank is rigidly supported and imparting said reciprocating movement thereto to thereby dispense concentrate from the outlet of the pump housing, said drive means including,
   a lever arm pivotally mounted in said cabinet and having a first forked end engaging the actuator of the pump means for imparting said reciprocating movement, said lever arm having a second forked end,
   a rotary cam engaged within the second forked end for pivoting said lever arm as said cam rotates to reciprocate said actuator, sand
   a motor for rotating said cam.

2. The apparatus of claim 1 wherein said storage tank comprises a substantially rigid outer container and a flexible bag therein, said flexible bag containing said concentrate, said discharge opening being formed through aligned openings in both said outer container and flexible bag.

3. The apparatus of claim 2 wherein said positive displacement pump means is a piston pump.

4. The apparatus of claim 2 wherein the integral connection between the pump means and storage tank is a flexible membrane movable between inboard and outboard positions of a wall of the storage tank in which said discharge opening is disposed such that said pump means is also movable to inboard and outboard positions with respect to the wall of the storage tank.

5. The apparatus of claim 4 wherein said positive displacement pump means is a piston pump.

6. The apparatus of claim 1 wherein the integral connection between the pump means and storage tank is a flexible membrane movable between inboard and outboard positions of a wall of the storage tank in which said discharge opening is disposed such that said pump means is also movable to inboard and outboard positions with respect to the wall of the storage tank.

7. The apparatus of claim 6 wherein said positive displacement pump means is a piston pump.

8. The apparatus of claim 1 wherein said positive displacement pump means is a piston pump.

* * * * *